United States Patent
Tanaka (10) Patent No.: US 7,436,436 B2
(45) Date of Patent: Oct. 14, 2008

(54) SIGNAL PROCESSING DEVICE, IMAGE PICKUP DEVICE AND SIGNAL PROCESSING METHOD

(75) Inventor: Seiji Tanaka, Saitama-ken (JP)

(73) Assignee: Fujifilm Corporation, Tokyo (JP)

( * ) Notice: Subject to any disclaimer, the term of this patent is extended or adjusted under 35 U.S.C. 154(b) by 764 days.

(21) Appl. No.: 10/981,710

(22) Filed: Nov. 5, 2004

(65) Prior Publication Data
US 2005/0093993 A1 May 5, 2005

(30) Foreign Application Priority Data
Nov. 5, 2003 (JP) .............................. 2003-375722

(51) Int. Cl.
*H04N 5/228* (2006.01)
(52) U.S. Cl. .............................. 348/208.4; 348/208.99; 348/208.5
(58) Field of Classification Search ............ 348/208.99, 348/208.1, 208.2, 208.3, 208.4, 208.5, 208.6, 348/208.7, 208.12, 208.13, 222.1, 257; 382/263, 382/275
See application file for complete search history.

(56) References Cited
U.S. PATENT DOCUMENTS

| | | | |
|---|---|---|---|
| 5,184,216 A * | 2/1993 | Kobayashi | ............. 348/207.99 |
| 5,583,597 A | 12/1996 | Enomoto | |
| 5,959,666 A * | 9/1999 | Naganuma | ................ 348/208.3 |
| 6,263,162 B1 * | 7/2001 | Yamazaki et al. | ............. 396/55 |
| 6,393,215 B1 | 5/2002 | Washisu | |
| 6,734,901 B1 * | 5/2004 | Kudo et al. | ............... 348/208.4 |
| 6,734,902 B1 * | 5/2004 | Kawahara | ................ 348/208.8 |
| 2004/0056963 A1 * | 3/2004 | Ishikawa | ................. 348/208.1 |

FOREIGN PATENT DOCUMENTS

| | | |
|---|---|---|
| JP | 5-68197 A | 3/1993 |
| JP | 7-110504 A | 4/1995 |
| JP | 8-82823 A | 3/1996 |
| JP | 2000-187258 A | 7/2000 |

* cited by examiner

*Primary Examiner*—David Ometz
*Assistant Examiner*—Antoinette T Spinks
(74) *Attorney, Agent, or Firm*—Birch, Stewart, Kolasch & Birch, LLP (57) ABSTRACT

A signal processing device including: a detecting mechanism that, based upon a predetermined stable state, outputs a shake signal corresponding to shake of a device body from the stable state; a DC removing mechanism that outputs a DC component removing signal obtained by removing a predetermined low frequency component from the shake signal of said detecting mechanism; a calculating mechanism that calculates attenuation characteristics of the shake signal attenuated in said DC removing mechanism; and a generating mechanism that generates a composite signal obtained by combining said DC component removing signal with an attenuating signal corresponding to the attenuation characteristics calculated in said calculating mechanism, as the shake signal representing shake of the device body.

23 Claims, 8 Drawing Sheets

SIGNAL PROCESSING DEVICE, IMAGE PICKUP DEVICE AND SIGNAL PROCESSING METHOD

CROSS-REFERENCE TO RELATED APPLICATIONS

This application claims priority under 35 USC 119 from Japanese Patent Application No. 2003-375722, the disclosure of which is incorporated by reference herein.

BACKGROUND OF THE INVENTION

1. Field of the Invention

The present invention relates to a signal processing device, an image pickup device and a signal processing method, and in particular, a signal processing device, an image pickup device and a signal processing method that detect shake of the body of the image pickup device for obtaining image data of photographed image during photographing.

2. Description of the Related Art

Devices such as digital video cameras, digital cameras and film cameras, having a function of correcting blurring of the photographed image due to shaking of the hand holding the device body (hereinafter refer to as camera shake) during photographing have been known. In such devices, to acquire image data without image blurring even when shaking occurs due to camera shake, a shake signal corresponding to the shake is obtained by detecting shake of the device due to camera shake. As a method of detecting the shake, a sensor for detecting acceleration, angular acceleration, angular speed and the like is used and a shake signal is obtained by an output signal of the sensor.

It is known that the above-nentioned output signal of the sensor includes components other than the signal due to shake, and therefore, when the output of the sensor is used as it is, the obtained shake signal may contain error. The components other than the shake signal due to shake includes DC components such as bias voltage in the case of no input to the sensor due to shake and offset voltage representing bias voltage when power is applied. For this reason, a highpass filter is connected to the sensor so as to remove the DC component, which is the component other than the shake signal component from the output signal of the sensor. Further, to correct shake applied to the device due to camera shake (frequency of about 1 to 10 Hz), a time constant of the highpass filter is increased. However, since the output signal attenuates by intervention of the highpass filter, when many DC components are included as in the completion of panning, the output signal attenuates in the negative direction from a central value among the signal output range capable of being outputted from the sensor and then gets closer to the central value. The central value means an output signal of the sensor when the device is in a stable state. Assuming that the signal attenuated in the negative direction from the central value (hereinafter referred to as residual DC component) is not a signal corresponding to the actual shake but a shake signal that is a signal including the residual DC components, there is a possibility that detection accuracy of actual shake of the device can be lowered. For this reason, processing for removing the residual DC components has been performed, however, there is a problem that the processing takes a long time.

Therefore, the art of making time constant of the highpass filter variable is known (Refer to, for example, Japanese Patent Application Laid-pen (JP-A) No. 8-82823, pages 7 to 8 and FIG. 8, and JP-A No. 2000-187258, pages 15 to 16 and FIG. 6).

According to this technique, when power is applied or when panning is carried out, time constant is decreased. Therefore, the output signal, in which many DC components are included when panning is completed, attenuates in the negative direction and then gets closer to the central value at shorter time than in the case where time constant is large. Accordingly, it is possible to shorten the time that is necessary for removing the residual DC components.

However, according to the above-nentioned technique, although the time for removing the residual DC components can be shortened by switching time constant of the highpass filter, influence of the residual DC components cannot be controlled. Moreover, the technique requires detection of operations such as panning, whereby further configuration for switching the time constant depending on the detected result is necessary.

SUMMARY OF THE INVENTION

In consideration of the above-mentioned facts, the present invention intends to provide a signal processing device, an image pickup device and a signal processing method that can easily obtain a shake signal with high accuracy.

A first aspect of the present invention is to provide a signal processing device comprising: a detecting mechanism that, based upon a predetermined stable state, outputs a shake signal corresponding to shake of a device body from the stable state; a DC removing mechanism that outputs a DC component removing signal obtained by removing a predetermined low frequency component from the shake signal of said detecting mechanism; a calculating mechanism that calculates attenuation characteristics of the shake signal attenuated in said DC removing mechanism; and a generating mechanism that generates a composite signal obtained by combining said DC component removing signal with an attenuating signal corresponding to the attenuation characteristics calculated in said calculating mechanism, as the shake signal representing shake of the device body.

The above-mentioned signal processing device has a detecting mechanism and outputs a shake signal corresponding to shake of the device due to panning after application of power to the device body, swing, shaking due to shaking of the hand holding the device body and the like. Based upon the stable state of the device body, the shake signal is output as a signal corresponding to the shake from the device body. The stable state means stationary state of the device body and the shake signal is output as a signal representing a shake component from the stationary state.

The shake signal output from the detecting mechanism includes the signal representing shake of the device body as well as components other than shake. The components other than shake component includes DC components such as bias voltage at the time when no shake is detected in the detecting mechanism and offset voltage representing bias voltage when power is applied. Thus, the DC removing mechanism removes predetermined low frequency component included in the shake signal. Removing the low frequency component by the DC removing mechanism, resulting in that DC component included in the shake signal is removed.

When the low frequency component is removed by the DC removing mechanism, the shake signal attenuates gradually. Attenuation characteristics representing the characteristics of the attenuating shake signal are calculated in a calculating mechanism. By calculating the attenuation characteristics, the attenuated amount of the shake signal attenuated in the DC removing mechanism is identified to obtain an attenuating signal indicating the attenuated amount. A generating mechanism obtains a composite signal of a DC component removing signal and the attenuating signal by combining the DC component removing signal with the attenuating signal corresponding to the DC component removing signal. For example, for such composite signal, there is a signal obtained by adding the attenuating signal corresponding to the DC component removing signal to the DC component removing signal. As a result, a composite signal obtained by combining the attenuating signal representing the amount attenuated from the shake signal corresponding to the DC component removing signal with the DC component removing signal is obtained. Further, the generating mechanism generates the composite signal as the shake signal representing shake of the device body.

In this way, it is possible to generate the composite signal obtained by combining the attenuating signal corresponding to the attenuation characteristics of the shake signal with the DC component removing signal, as the shake signal. Therefore, it becomes possible to remove the low frequency component contained in the shake signal, and at the same time, to obtain the shake signal in which attenuation of the shake signal due to removal of the low frequency component is suppressed.

Since it is possible to obtain the shake signal in which attenuation of the shake signal in the DC removal mechanism is controlled, attenuation of the shake signal in the negative direction from a stable state at completion of panning can be suppressed, thereby to suppress influence of the residual DC component representing signal component due to attenuation in the negative direction. Therefore, the shake signal with high accuracy can be obtained.

A second aspect of the present invention is to provide a signal processing device comprising: a detecting mechanism that, based upon a predetermined stable state, outputs a shake signal corresponding to shake of a device body from the stable state; a DC removing mechanism that outputs a DC component removing signal obtained by removing a predetermined low frequency component from the shake signal of said detecting mechanism; a deriving mechanism that derives a signal corresponding to attenuation characteristics of the shake signal attenuated in said DC removing mechanism, as a reference signal; and a creating mechanism that creates a signal representing the component of the DC component removing signal, based upon said reference signal, as the shake signal representing shake of the device body.

Since the shake signal output from the detecting mechanism is a signal corresponding to shake from a stable state with a reference to a predetermined stable state, the shake signal attenuated in the DC removing mechanism, i.e., the DC component removing signal is also a signal based upon the above stable state. Thus, providing that the signal attenuated corresponding to the attenuated amount of the shake signal is set as a reference presenting the stable state, attenuation of the shake signal can be controlled.

The deriving mechanism attenuates the reference representing the stable state corresponding to attenuation characteristic of the shake signal attenuated in the DC removing mechanism. For this reason, the reference signal that attenuates the reference representing the stable state corresponding to the attenuated amount of the shake signal is derived by the deriving mechanism. With respect to the DC component removing signal, which is the shake signal attenuated by the attenuated amount, the creating mechanism creates the signal representing the component of the DC component removing signal, based upon the reference signal as the shake signal representing shake of the device body. In other words, the DC component removing signal representing shake from the reference indicating the stable state can be treated as the signal corresponding to the shake from the reference signal that attenuates the reference representing the stable state. Further, the DC component removing signal based upon this reference signal can be generated as the shake signal of the device. Therefore, attenuation of the shake signal can be easily controlled with simple configuration and the shake signal can be easily obtained with high accuracy.

Also, the DC removing mechanism can determine the frequency component to be removed, based upon a filter having a predetermined time constant.

The shake signal detected by the shake of the device body contains components with various frequency bands that vary depending on the type of the shake. Accordingly, a filter having a predetermined time constant may be adopted as the DC removing mechanism and the time constant may be set corresponding to the frequency component to be removed. This enables removing arbitrary frequency component easily and removing the component due to shake of the type corresponding to the frequency component to be removed.

A third aspect of the invention is to provide an image pickup device comprising: a detecting mechanism that, based upon a predetermined stable state, outputs a shake signal corresponding to shake of a device body from the stable state; a DC removing mechanism that outputs a DC component removing signal obtained by removing a predetermined low frequency component from the shake signal of said detecting mechanism; a calculating mechanism that calculates attenuation characteristics of the shake signal attenuated in said DC removing mechanism; a generating mechanism that generates a composite signal obtained by combining said DC component removing signal with an attenuating signal corresponding to the attenuation characteristics calculated in said calculating mechanism, as the shake signal representing shake of the device body; a setting mechanism that sets a part of a photographed image photographed by an imaging device for picking up image of an object as an effective imaging region, based on an input signal and acquires image data of the photographed image within the effective imaging region as image data by photographing; and a controlling mechanism that outputs, to said setting mechanism, a change signal for changing said effective imaging region according to the shake signal of said generating mechanism so as to compensate for the shake of the device body.

The above-mentioned image pickup device has the detecting mechanism and outputs a shake signal corresponding to shake of the device body due to panning after application of power to the device, swing, shaking due to shaking of the hand holding the device body and the like. The shake signal output from the detecting mechanism includes the signal representing shake of the device as well as components other than shake. Thus, the DC removing mechanism removes predetermined low frequency component included in the shake signal. Removing the low frequency component by the DC component removing mechanism, resulting in that the DC component included in the shake signal is removed. When the low frequency component is removed by the DC removing mechanism, the shake signal attenuates gradually. Attenuation characteristics representing the characteristics of the attenuating shake signal are calculated in a calculating mechanism. By calculating the attenuation characteristics, attenuated amount of the shake signal attenuated in the DC removing mechanism is identified to obtain an attenuating signal indicating the attenuated amount. The generating mechanism obtains a composite signal of a DC component removing signal combined with the attenuating signal by combining the DC component removing signal with the attenuating signal corresponding to the DC component removing signal. Further, the generating mechanism generates the composite signal as the shake signal representing shake of the device body. When the shake signal of the device body is generated in the generating mechanism, a controlling mechanism outputs a change signal for compensating for the shake of the device body to a setting mechanism. The setting mechanism serves to set a part of photographed image acquired by photographing an object as the effective imaging region and changes the effective imaging region by an imaging device corresponding to the change signal output from the controlling mechanism. As a result, the effective imaging region of the photographed image acquired by the imaging device is changed to compensate for the shake of the device body. Further, since the setting mechanism acquires image data of the photographed image within the effective imaging region as image data by photographing, the image data on which influence due to the shake of the device body is controlled can be obtained.

A fourth aspect of the invention is to provide a signal processing method of outputting, based upon a predetermined stable state, a shake signal corresponding to shake of the device body from the stable state, the method comprising: outputting a DC component removing signal obtained by removing a predetermined low frequency component from said shake signal; calculating attenuation characteristics of shake signal attenuated in the step of outputting the DC component removing signal; and generating a composite signal obtained by combining said DC component removing signal with an attenuating signal corresponding to said calculated attenuation characteristics, as the shake signal representing shake of the device body.

DETAILED DESCRIPTION OF THE INVENTION

An embodiment of a digital camera 10 capable of applying a shake correction device of the present invention will be described referring to the appended drawings.

Figure 1:
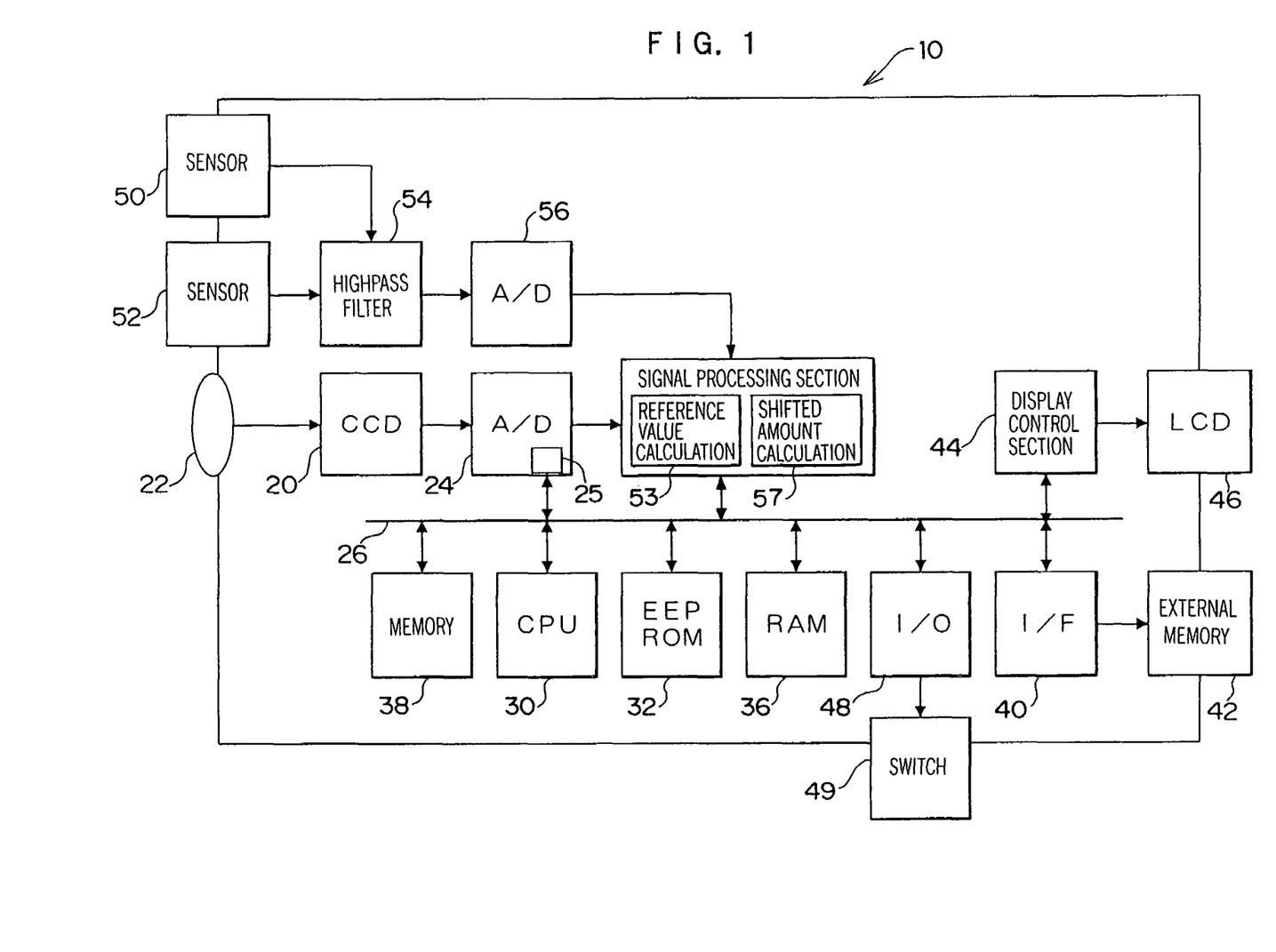
FIG. 1 is a block diagram of a main configuration of a digital camera in accordance with an embodiment of the present invention.

FIG. 1 is a block diagram of a main configuration of the digital camera 10 according to the present embodiment.

The digital camera 10 has a Charge Couple Device (CCD) 20. The CCD 20 converts reflected light from an object which is obtained by a lens 22 into analog image data representing a photographed image and output the converted data. Further, the digital camera 10 has an analog/digital converter (hereinafter referred to as A/D converter) 24 and a signal processing section 28. The signal processing section 28 is connected to a bus 26 so as to exchange data and command.

The A/D converter 24 performs correlated double sampling processing of an output signal that represents an image of the object output from the CCD 20 through a CDS (not shown), separates the signal into color signals R, G and B, and converts an analog signal subjected to processing such as adjustment of the signal level of each color signal into a digital image signal (hereinafter referred to as image data), and then outputs the image data to the signal processing section 28.

The A/D converter 24 includes a CCD read position switching section 25. The CCD read position switching section 25 changes a range in which the CCD 20 converts into image data representing a photographed image and outputs the data in its effective pixel region (hereinafter referred to as segmentation region) by control of a CPU 30, which will be described later. That is, the CCD read position switching section 25 sets the segmentation region as the range of the output of the image data among the effective pixel region (hereinafter referred to as effective region) in which the CCD 20 can pick up an image.

Figure 5:
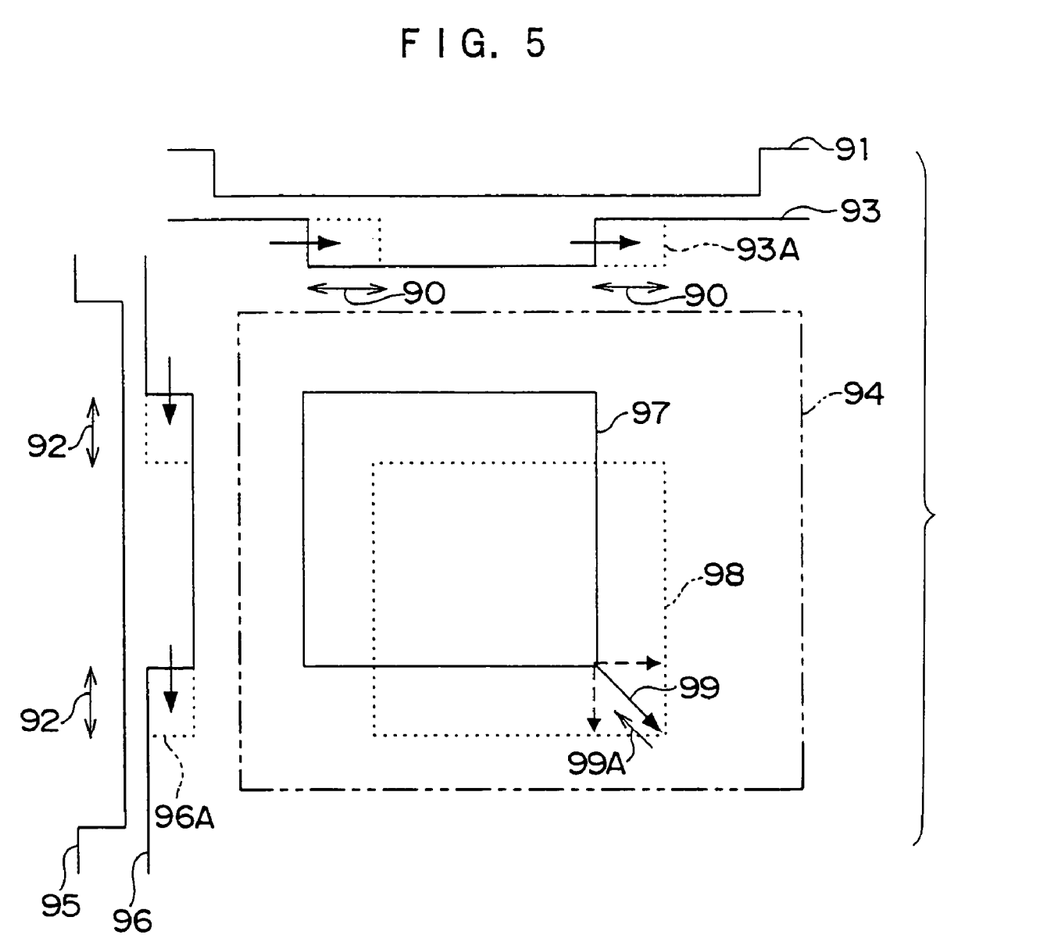
FIG. 5 is a schematic diagram showing switch of CCD read position.

Specifically, as shown in FIG. 5, in a case that a horizontal effective signal 91 as well as a vertical effective signal 95 can be obtained by the CCD 20, the effective region in which the CCD 20 can pick up an image falls within an effective region 94.

Here, in the CCD read position switching section 25, for example, given that it is initially set to obtain an effective signal 93 as a horizontal segmentation effective signal and an effective signal 96 as a vertical segmentation effective signal, the segmentation region segmented as the image data is set as a segmentation region 97 at initial setting. The segmentation region 97 is changed by control of the CPU 30 (described later) and, for example, changed to a segmentation region 98 from the segmentation region 97 (described in detail later). The image data within the segmentation region is output from the A/D converter 24 and is input to the signal processing section 28.

The digital camera 10 also has a microcomputer comprised of the CPU 30, an EEPROM 32 and a RAM 36. These devices are connected with each other via the bus 26 so as to exchange data and command. The CPU 30 controls various devices forming the digital camera 10. The EEPROM 32 stores various programs and predetermined data therein. The RAM 36 mainly temporally stores information generated by the various programs therein.

A memory 38 is connected to the bus 26 so as to exchange data. The memory 38 stores information such as the input signal from the sensor (described in detail later), the image data processed in the signal processing section 28 (described in detail later) and various parameters therein. Further, an I/F 40, an I/O 48 and a display control section 44 are connected to the bus 26 so as to exchange data and command. A switch 49 is connected to the I/O 48. The switch 49 inputs various instructions. The switch 49 includes a release switch (not shown) for instructing to obtain image data of the photographed image by photographing and a power switch (not shown) for instructing to supply electric power to various sections of the digital camera 10.

The I/F 40 reads and writes various data including image data from or into an external memory 42. The external memory 42 is connected to the I/F 40 by being loaded into a slot (not shown) provided in the digital camera 10 so as to exchange data therebetween. A recording medium such as IC card and videotape and the like are an example for the external memory 42. The image data obtained through correction processing depending on shake (described in detail later) in the signal processing section 28 is stored into the external memory 42 via the I/F 40. The display control section 44 displays the image of the image data subjected to correction processing depending on shake and various menu items and the like on a LCD 46.

The digital camera 10 is provided with sensors 50 and 52 for measuring shake of a photo optical system with respect to the object after applying power to the digital camera 10. The sensors 50 and 52 detect shake of the photo optical system, which includes a lens 22 and the CCD 20 with respect to the object to be photographed and detects shake by detecting angular speed, acceleration, angular acceleration, angular displacement and the like. One example of the sensors 50 and 52 is a gyro sensor. In the present embodiment, the sensor 50 detects angular speed of rotational movement of the digital camera 10 in a predetermined direction orthogonal to an optical axis of the photo optical system, which includes a lens 22 and the CCD 20 (hereinafter referred to as vertical direction), and outputs a signal corresponding to the angular speed in the vertical direction. The sensor 52 detects angular speed of rotational movement of the digital camera 10 in the direction that is orthogonal to the optical axis of the photo optical system and rotated about 90 degrees from the above-nentioned detection direction of the sensor 50 (hereinafter referred to as horizontal direction) and outputs a signal corresponding to the angular speed in the horizontal direction.

Figure 8A:
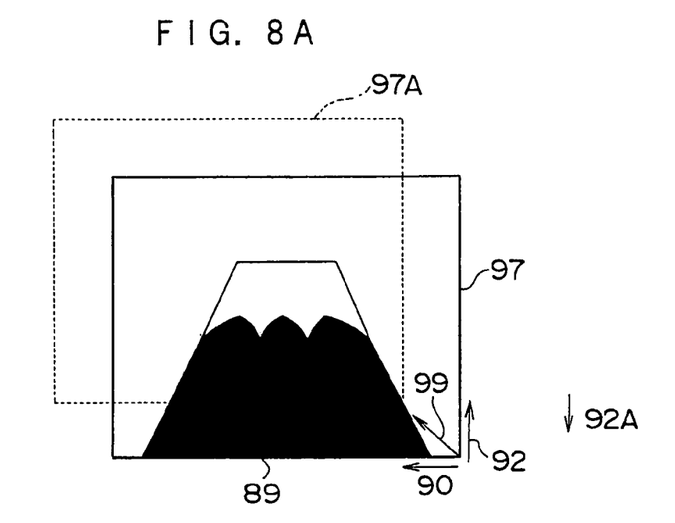
FIG. 8A is a schematic view of displacement of an object with respect to a segmentation region due to shake.
Figure 8B:
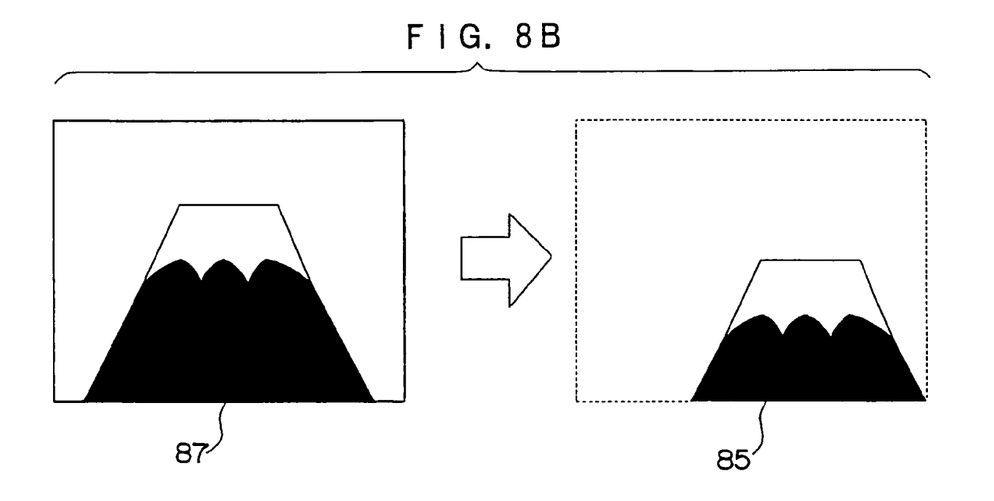
FIG. 8B is a schematic view of displacement of the object with respect to a segmentation region due to shake.

Specifically, the sensors 50 and 52 detects that the object displaces from the inside of segmentation region 97 as the initial setting of the digital camera 10 to the outside of the segmentation region 97. For example, as shown in FIG. 8A, when the segmentation region 97 with respect to the object 89 moves to the position of a segmentation region 97A due to shake of the digital camera 10, the photographed image within the segmentation region 97 displaces from an image 87 to an image 85 in FIG. 8B. This displaced amount is detected by the sensors 50 and 52 as a shifted amount in each of vertical and horizontal directions and output as output signals of these sensors.

However, since the output signals of the sensors 50 and 52 are substantially small signals, the signals need to be amplified through a circuit not shown. Further, the output signals of the sensors 50 and 52 include DC component of offset component such as null voltage and DC component. For this reason, a highpass filter 54 is connected to the sensor 50 and the sensor 52, respectively.

The highpass filter 54 removes DC components from the output signals of the sensors 50 and 52. The highpass filter 54 carries out its function by connecting a CR DC cut circuit, which includes a capacitance and a resistance, to the sensors 50 and 52. Through the highpass filter 54, the output signals of the sensors 50 and 52 are amplified and low frequency components are cut off, resulting in cut-off of the DC components. Each output signals of the sensors 50 and 52, having the DC components cut off, are sampled in the A/D converter 56 and input to the signal processing section 28 as output data (hereinafter referred to as input value).

In the present embodiment, the highpass filter 54 has a time constant for cutting off the signal with a low frequency of, for example, 0.1 Hz or less, and does not affect a frequency band between, for example, 1 to 10 Hz applied on the digital camera 10.

Now, removal of the low frequency component by means of the highpass filter 54 will be described. For convenience of explanation, although only the output signal of the sensor 50 is described, the input value of the output signal of the sensor 52 is processed in a similar way and the same result is obtained.

Figure 2A:
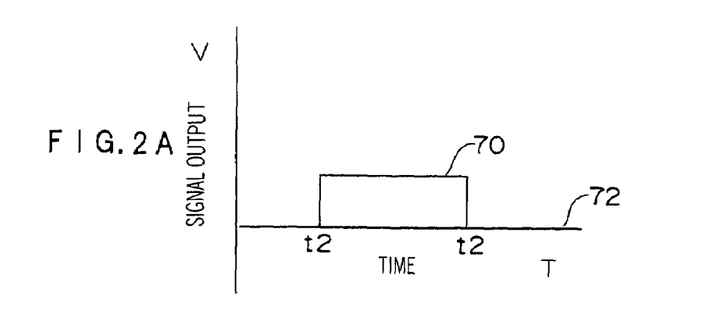
FIG. 2A is a diagram showing a waveform of an output signal output from a sensor.

When panning occurs during photographing with the digital camera 10, during the period between start time (t1) to end time (t2) of panning, for example, a signal 70 having a substantially rectangular wave that represents change from a first reference value 72 is output from the sensor 50 as shown in FIG. 2A. Note that the first reference value 72 is a central value of the output signal corresponding to the shake detected by the sensor 50. In other words, the condition represented by the first reference value 72 is the same condition as such that no shake is detected by the sensors 50 and 52. Therefore, a cumulated value of the changed amount from the first reference value 72 of the output signals of the sensors 50 and 52 represents shake of the segmentation region 97 with respect to the object in the vertical direction due to panning, that is, a shifted amount 92 for shifting the segmentation region 97. However, since the output signal of the sensor 50 includes any error in the sensor 50 (output in the absence of acceleration input by the sensor 50), the highpass filter 54 needs to be intervened. Specifically, a flat part parallel to the first reference value 72 of the substantially rectangular wave 70 as shown in FIG. 2A includes a waveform (low frequency component) representing amplitude that indicates the error not shown.

Figure 2B:
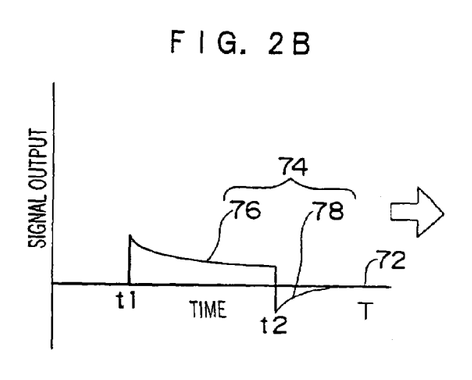
FIG. 2B is a diagram showing a waveform of an input value obtained by the waveform of FIG. 2A subjected through a highpass filter.

Since the low frequency component is attenuated greatly through the highpass filter 54, when the rectangular wave 70 is input to the highpass filter 54, the waveform of the output signal of the sensor 50 becomes, for example, as a waveform 74 shown in FIG. 2B. As shown by the waveform 74, the output signal of the sensor 50 represents a curve 76 that attenuates gradually during the period between start time (t1) and end time (t2) of panning, shifts in the negative direction by attenuated portion (curve 78) when the output signal becomes from H to L (time t2) and then gets closer to the first reference value 72 gradually. Note that, the attenuation factor of the curve 76 is determined depending on the time constant of the highpass filter 54.

Figure 2C:
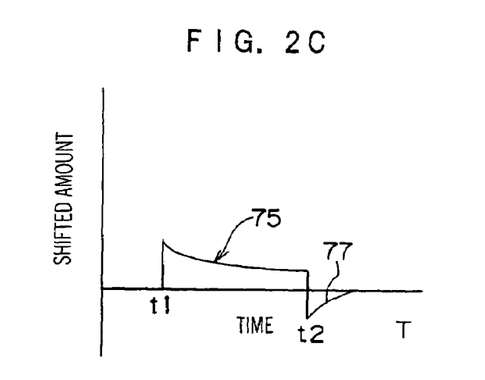
FIG. 2C is a diagram showing a shifted amount acquired corresponding to the waveform and reference value of the input value in FIG. 2B.

Conventionally, by performing various arithmetic processing on the basis of the cumulated value obtained by subtracting the first reference value 72 from the input value of the output signal of which low frequency component is removed as shown by the waveform 74, a shifted amount in the vertical direction due to shake has been acquired. For example, as shown in FIG. 8A, when photographing, the shifted amount 92 in the vertical direction at the time when the segmentation region 97 shifts to the segmentation region 97A due to shake is acquired. However, in fact, the shifted amount obtained depending on the waveform 74 in FIG. 2B becomes, for example, a waveform 75 shown in FIG. 2C. That is, the shifted amount of the point shifted in the negative direction (curve 78) at the time when panning is finished (time t2) as shown in FIG. 2B is calculated as the shifted amount in the negative direction as shown by a waveform 77 in FIG. 2C. For this reason, although shift (shake) of the body of the digital camera 10 due to panning has stopped in fact, there is a possibility that shift in the opposite direction to the shifted amount 92 such as correction in response to the shifted amount 92A may be performed. Therefore, it is impossible to perform shake correction with high accuracy.

Even in another conventional art of making the time constant of the highpass filter 54 variable, this shift in the negative direction (curve 78) at the time when panning is finished cannot be prevented.

Consequently, in the digital camera 10 of the present embodiment, the signal processing section 28 includes a reference value calculating section 53 and a shifted amount calculating section 57. Depending on shifted amount from the original position (position of initial setting) of the segmentation region of the digital camera 10 with respect to the object due to shake, the signal processing section 28 calculates a shifted amount 90 in the horizontal direction and the shifted amount 92 in the vertical direction for shifting the segmentation region so as to suppress the shifting, and to obtain image data within the segmentation region after shifting the segmentation region depending on the calculated shifted amount (described in detail later). The position of initial setting means a position at which the segmentation region is located so that a central position of the effective pixel region becomes substantially same as a central position of the segmentation region.

The reference value calculating section 53 calculates a second reference value obtained by attenuating the first reference value corresponding to attenuation of input values of the sensors 50 and 52. The shifted amount calculating section 57 calculates the cumulated value of the shifted amount from the start to end of panning for each frame on the basis of the second reference value and the corresponding input value. The reference value calculating section 53 calculates the second reference value obtained by changing the first reference value depending on attenuation of the input value. Specifically, the reference value calculating section 53 calculates the second reference value according to the following formula (1).

Next second reference value=present second reference value−(input value−first reference value)/time constant   (1)

According to the above formula (1), the next second reference value is calculated sequentially based on the input value that is sequentially sampled in and output from the A/D converter 56. This enables obtaining the second reference value obtained by attenuating the first reference value according to attenuation of the input value of the output signal of the sensor 50 through the highpass filter 54.

Figure 3A:
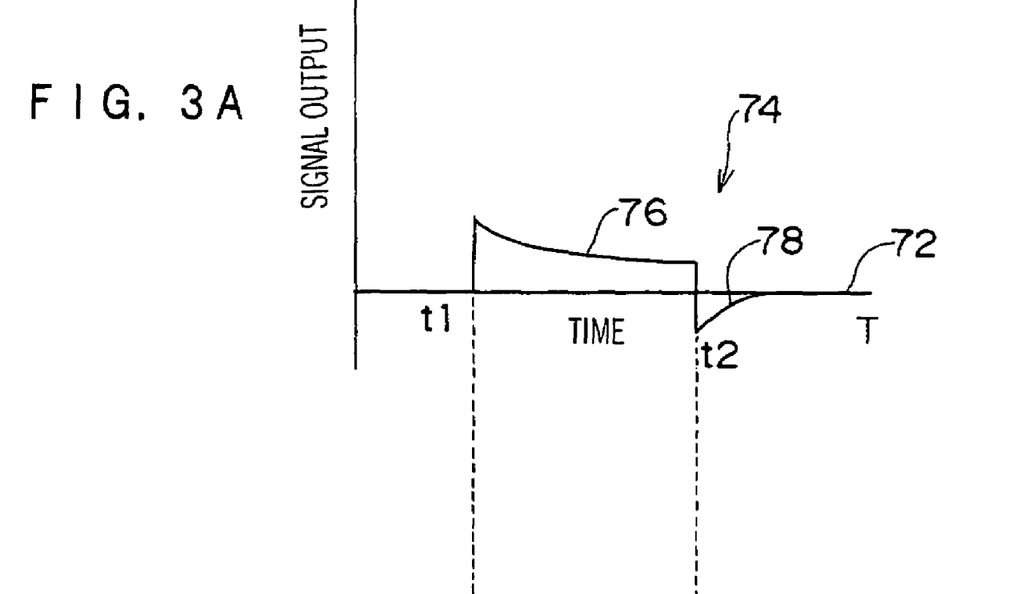
FIG. 3A is a diagram showing change in reference value and an input value of the sensor obtained through a highpass filter.
Figure 3B:
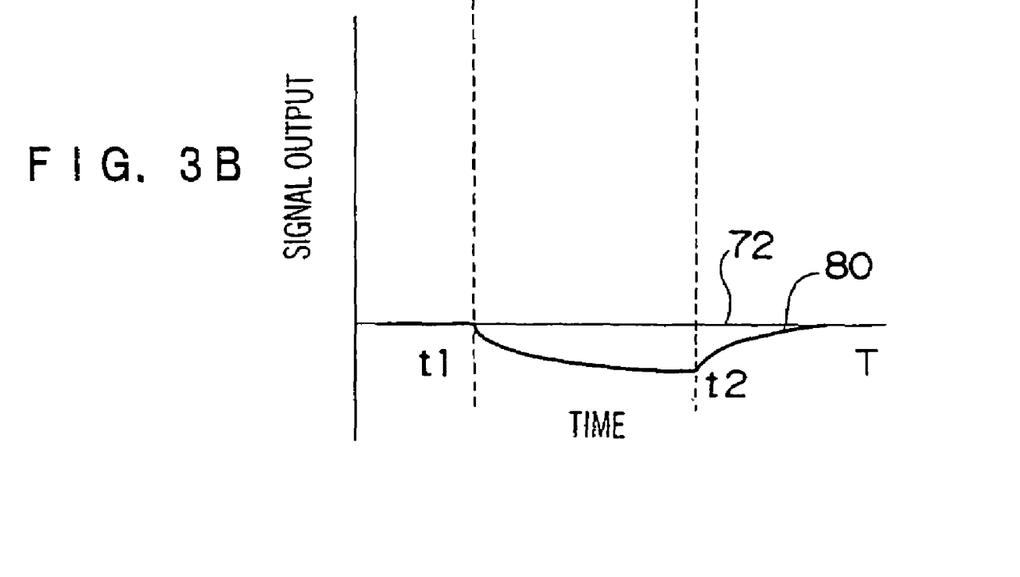
FIG. 3B is a diagram showing the changed reference value.

For example, by sequentially calculating the second reference value according to attenuation of the input value in the reference value calculating section 53, a waveform 80 representing the second reference value shown in FIG. 3B is obtained. Specifically, the waveform 80 shown in FIG. 3B is obtained by the calculation according to the above-nentioned formula (1) in response to attenuation of the waveform 74 representing the input value of the sensor 50 shown in FIG. 3A.

Figure 2D:
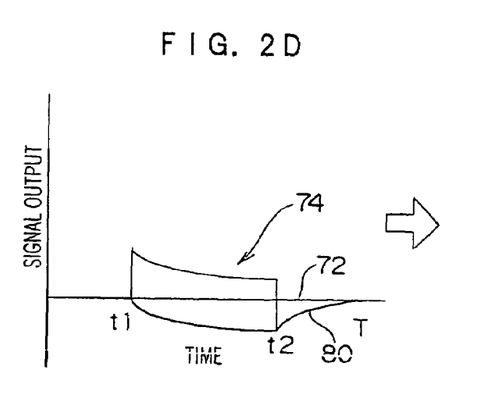
FIG. 2D is a diagram showing a waveform in the case where the reference value is changed corresponding to the input value obtained by the waveform of FIG. 2A subjected through a highpass filter and the changed reference value.
Figure 2E:
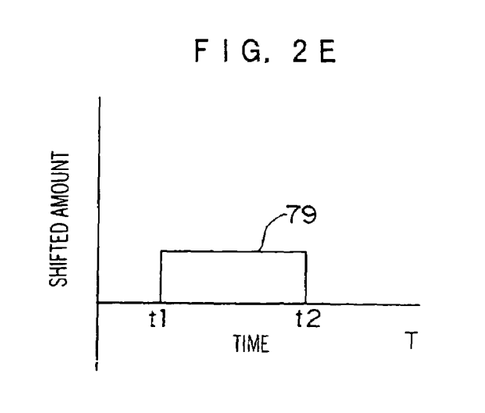
FIG. 2E is a diagram showing a shifted amount acquired corresponding to the waveform and reference value of the input value in FIG. 2D.

When the second reference value is sequentially calculated according to attenuation of the input value in the reference value calculating section 53, the calculated result is output to the shifted amount calculating section 57. The shifted amount calculating section 57 calculates the cumulated value of the difference between the input value of the sensor 50 and the second reference value as the shifted amount 92. Specifically, the difference between the input value of the sensor 50 shown by the waveform 74 and the second reference value shown by the waveform 80, in FIG. 2D, is calculated as the vertical shifted amount (in the case of the sensor 50) (refer to FIG. 2E). As shown in FIG. 2E, by calculating the shifted amount from the input value based on the second reference value, a waveform 79 that is substantially the same as the waveform 70 of the output signal of the sensor 50 is obtained as a waveform representing the shifted amount 92 in the vertical direction (sensor 50). Specifically, it is possible to obtain the waveform 79 representing the shifted amount 92 according to the signal having the offset component such as null voltage contained in the output signal of the sensor 50 is removed.

Similarly, in the reference value calculating section 53 and the shifted amount calculating section 57, the waveform 70 of the output signal of the sensor 52 is obtained as the shifted amount 90 in the horizontal direction.

Therefore, correction during shift in the negative direction (curve 78), which had been impossible in calculating the shifted amount by using the first reference value, becomes possible.

Note that the sensors 50 and 52 correspond to a detecting mechanism of the signal processing device of the invention, the highpass filter 54 corresponds to a DC removing mechanism and the reference value calculating section 38 corresponds to a calculating mechanism and a deriving mechanism. The shifted amount calculating section 56 corresponds to a generating mechanism and a creating mechanism.

Next, operations of the digital camera 10 in accordance with the above-mentioned embodiment will be described.

Figure 4:
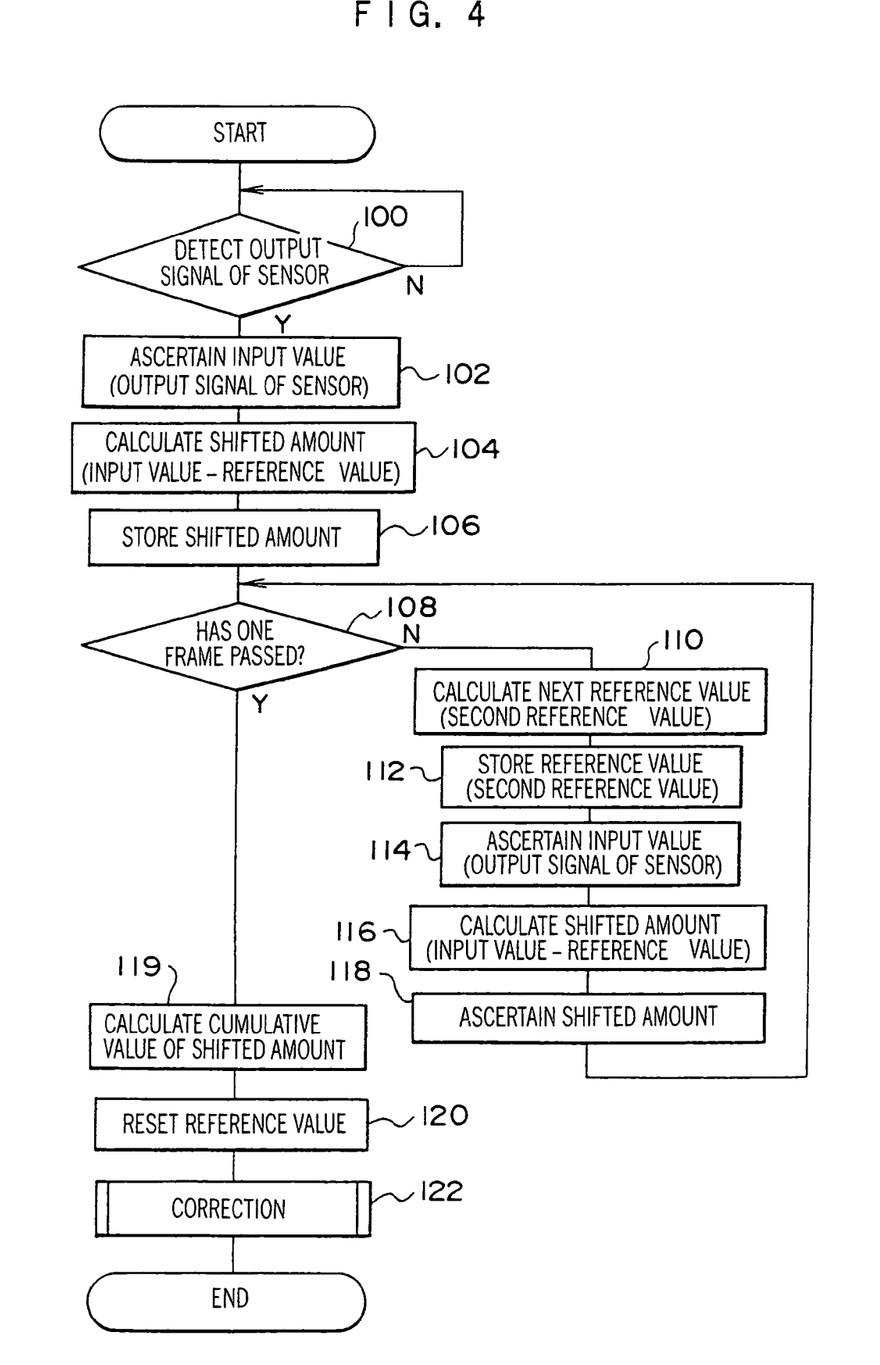
FIG. 4 is a flowchart showing flow of correction processing in the digital camera.

FIG. 4 shows processing routine performed in the CPU 30. In the present embodiment, the case where image stabilizing correction of an image for one frame is performed is described. Further, in the present embodiment, the case where image stabilizing correction based on the output signal of the sensor 50 is performed is described. Furthermore, although the case where dynamic image data is obtained by photographing is assumed in the present embodiment, static image data may be obtained.

In the digital camera 10, when photographing is started by the operation of pressing a release switch (not shown) included in the switch 49 after power supply voltage is applied by a power supply switch (not shown) included in the switch 49, the processing routine shown in FIG. 4 is performed every predetermined time and proceeds to a step 100.

At the step 100, it is determined whether or not the output signal of the sensor 50 is detected. At the step 100, the determination can be made by deciding whether or not the output signal of the sensor 50 is stored in the memory 38. When a signal is output from the sensor 50 due to panning and the like of the digital camera 10 during photographing, the output signal is input to the signal processing section 28 via the highpass filter 54 and the A/D converter 56, and then stored in the memory 38 every sampling rate of the A/D converter 56 sequentially. Note that, in the present embodiment, although it is described that the output signal of the sensor 50 is stored in the memory 38, a memory section (not shown) may be provided in the signal processing section 28 and the output signal may be stored sequentially therein.

Next, at a step 102, processing of ascertaining the input value is performed. The processing at the step 102 serves to ascertain the input value output initially in time sequence from the input values stored in the memory 38.

Next, at a step 104, processing of calculating the shifted amount is performed. The processing at the step 104 obtains the shifted amount by subtracting the first reference value previously stored in the memory 38 from the input value ascertained at the step 102. During processing at the step 104, the value that is equal to the first reference value is stored in the memory 38 as the second reference value. The second reference value is updated sequentially in the processing described hereinafter.

Next, at a step 106, the shifted amount calculated at the step 104 is stored in the memory 38 and then the operation proceeds to a step 108.

At the step 108, it is determined whether or not one frame has passed. At the step 108, the determination can be made by, for example, identifying signal output indicating that one frame has passed by a timer (not shown). For example, when photographing is started by the operation of pressing a release switch (not shown), the output of the signal indicating that one frame has passed starts counting by the timer (not shown) and when it is counted that a predetermined photographing time for one frame has passed, the signal indicating that one frame has passed is output and then the timer is reset to start counting again. For example, the predetermined photographing time for one frame may be calculated from the frame rate of photographing. By identifying signal output indicating that one frame has passed by the timer not shown, it is determined whether or not one frame has passed.

When it is determined that one frame has not passed at the step 108, the operation proceeds to a step 110 and processing of calculating a next reference value is performed. At the step 110, depending on the input value ascertained at the step 102, the second reference value stored in the memory 38, the first reference value stored in the memory 38 in advance and predetermined time constant of the highpass filter 54, the next second reference value is calculated according to the formula (1) described above. Through processing at the step 110, the second reference value depending on change in the input value is calculated. The calculated second reference value is stored in the memory 38 at a step 112.

At a step 114, similarly to the step 102, processing of ascertaining the input value is performed. In the step 114, the unprocessed and earliest input value in time series among the input values of the sensor 50 stored in the memory 38 is ascertained. At a next step 116, similarly to the step 104, the shifted amount is calculated by acquiring a difference between the input value ascertained at the step 114 and the second reference value stored in the memory 38 at the step 112. Further, at a next step 118, the calculated shifted amount is stored in the memory 38 and the operation returns to the step 108.

By repeating processing at the steps 108 to 118, the second reference value according to the input value is sequentially calculated and stored in the memory 38 and the shifted amount in each input value is calculated according to the calculated second reference value and stored in the memory 38.

On the other hand, when it is determined that one frame has passed at the step 108, the operation proceeds to a step 119 and the cumulated value of the shifted amount for one frame stored in the memory 38 is calculated and the calculated result is stored in the memory 38 as a shifted amount 99 in the photographed image for one frame.

Next, at a step 120, the second reference value stored in the memory 38 is updated to a value indicating the first reference value and then the operation proceeds to a step 122.

In this way, each of the cumulated value of the horizontal shifted amount (shifted amount 90) and the cumulated value of the vertical shifted amount (shifted amount 92), which are caused by shake, can be obtained.

Note that the processing similar to the above-mentioned processing routine is performed also in the sensor 52. The horizontal shifted amount due to shake is sequentially stored in the memory 38 and the cumulated value of the shifted amount for each frame is stored in the memory 38.

At a step 122, according to the cumulated value of the shifted amount in each of vertical and horizontal directions calculated through the above-mentioned processing, processing of correction of image data (described in detail later) is performed and this routine is finished.

As described above, in the digital camera 10 of the invention, the second reference value obtained by sequentially changing the first reference value according to the input value of the sensor 50 is calculated and the shifted amount of the digital camera 10 is acquired from the second reference value and the input value. Accordingly, since influence of attenuation of the output signal (input value) output from the sensor 50 via the highpass filter 54 can be removed, the shifted amount due to shake can be obtained with high precision.

Moreover, since the second reference value can be calculated so that the second reference value calculated in the reference value calculating section 53 gets closer to the first reference value as the input value gets closer to the first reference value, correction accuracy can be maintained at all times.

Further, since the first reference value for calculating the shifted amount can be changed depending on the input value in the reference value calculating section 53, the shifted amount due to shake can be calculated with high precision without making time constant of the highpass filter 54 variable. Therefore, it becomes unnecessary to provide circuitry for making time constant of the highpass filter 54 variable.

Further, since the highpass filter 54 can control shift in the negative direction due to removal of low frequency component of the output signal of the sensor, the shifted amount due to shake in the low frequency region can be calculated with high precision with keeping time constant of the highpass filter 54 small.

In the present embodiment, although the output signal of each of the sensors 50 and 52 is sampled in the A/D converter 56 and input to the signal processing section 28 as output data (hereinafter referred to as input value), it may be input to the signal processing section 28 as an analog signal. In this case, data representing the shifted amount may be obtained as a shift signal representing the shifted amount. Further, through subsequent processing, segmentation region may be shifted corresponding to the shift signal.

Next, correction processing performed at the step 122 will be described.

Figure 6:
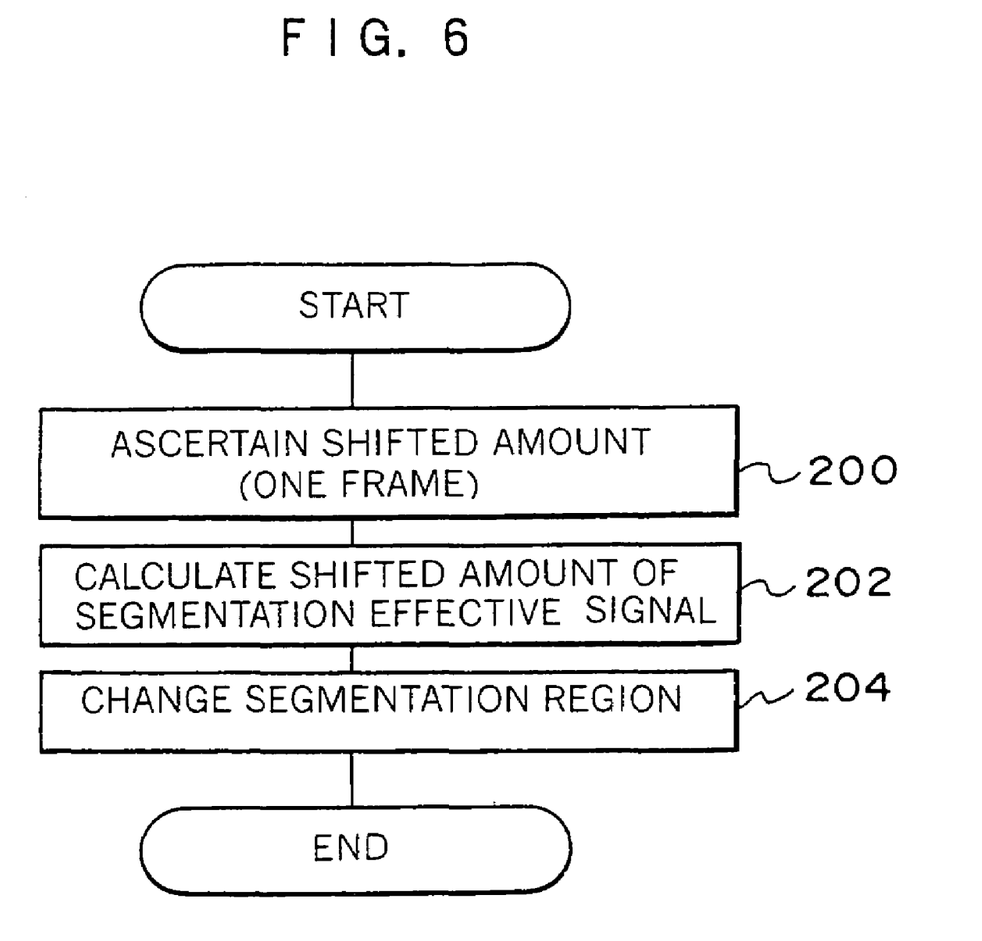
FIG. 6 is a flowchart showing correction processing by switch of CCD read position.

In the CPU 30, every time the value representing the cumulated value of the shifted amount for each frame in each of horizontal and vertical directions is stored in the memory 38, interruption processing as shown in FIG. 6 is performed and the operation proceeds to a step 200. In the step 200, the value representing the cumulated value of the shifted amount for each frame in each of horizontal and vertical directions that is stored in the memory 38 is ascertained. Through the processing at the step 200, for example, the shifted amount 92 in the vertical direction and the shifted amount 90 in the horizontal direction, which are shown in FIG. 8A, are obtained.

Next, at a step 202, according to the value of the shifted amount ascertained at the step 200, the shifted amount of a segmentation effective signal in each of horizontal and vertical directions is calculated so as to shift the segmentation region 97 in the directions for suppressing shift in the horizontal and vertical directions due to shake of the digital camera 10. At the step 202, as shown in FIG. 5, according to each of the vertical shifted amount 92 and the horizontal shifted amount 90 that are ascertained at the step 200, each of the shifted amount 90 and the shifted amount 92 of the horizontal effective signal 93 and the vertical effective signal 96 obtained by the CCD 20, respectively, is acquired.

Next, at a step 204, according to the shifted amount in each of horizontal and vertical directions that is calculated at the step 202, the segmentation region is changed in the CCD read position switching section 25 and then this routine is finished. At the step 204, according to the shifted amount 90 in the horizontal direction and the shifted amount 92 in the vertical direction, the segmentation region 97 is shifted, thereby to be changed to the segmentation region 98 by shifting at the shifted amount 99. Through processing at the step 204, the segmentation region is changed so that, for example, the initial segmentation region 97 preset in the initial setting as shown in FIG. 5 becomes the segmentation region 98.

In this way, based on the cumulated value of the shifted amount in each of the horizontal and vertical directions that is calculated at the step 119, the proper segmentation region 96 (initial setting) within the effective pixel region 94 of the CCD 20 can be shifted to the segmentation region 98 according to the movement of panning. Thus, shake correction of image data can be performed with high accuracy.

Further, since the image corresponding to the segmentation region segmented from the image obtained by the CCD 20 as the image data, the image data subjected to shake correction can be obtained faster than the case of driving the photo optical system based on the shifted amount.

Note that, it is possible to perform the correction processing carried out at the step 122 with a higher accuracy.

Figure 7:
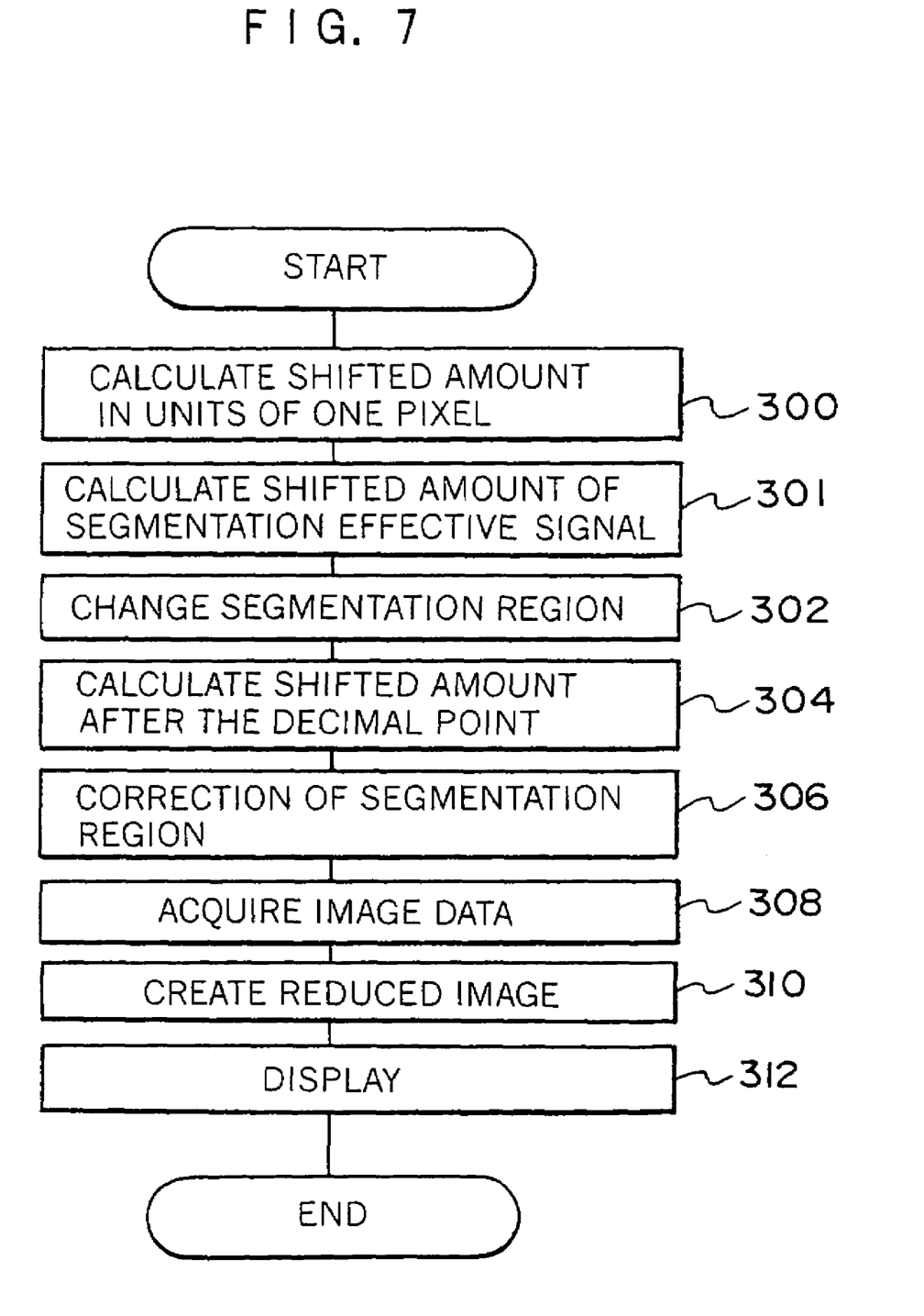
FIG. 7 is a flowchart showing correction processing in units of one pixel.

Specifically, in the CPU 30, every time the value representing the shifted amount for one frame is stored in the memory 38, the interruption processing shown in FIG. 7 is performed and the operation proceeds to a step 300. At the step 300, arithmetic processing of the shifted amount in units of one pixel is performed. At the step 300, the value representing the shifted amount in each of the horizontal and vertical directions that is stored in the memory 38 is ascertained and the shifted amount in units of one pixel is calculated corresponding to the ascertained shifted amount.

Next, at a step 301, substantially similarly to the step 202, depending on the value representing the shifted amount in units of one pixel that is calculated at the step 300, the shifted amount of a segmentation effective signal in each of horizontal and vertical directions are calculated so as to shift the segmentation region in the directions for suppressing shift in the horizontal and vertical directions due to shake of the digital camera 10.

In this case, a region that is extended from a region obtained as a photographed image by one pixel is predetermined as the segmentation region.

Next, at a step 302, similarly to the step 204, the segmentation region is changed corresponding to shift of the segmentation effective signal in each of the horizontal and vertical directions that is calculated at the step 301. Through processing at the step 302, the image data subjected to correction processing in units of one pixel corresponding to the shifted amount of the digital camera 10 is obtained.

At a step 304, the shifted amount of one pixel or less, that is, the shifted amount in units of one pixel after the decimal point is calculated. Next, at a step 306, with respect to the image data subjected to correction processing in units of one pixel corresponding to the shifted amount at the step 302, correction processing of the segmentation region segmented as the image data is performed corresponding to the shifted amount in units of one pixel after decimal points that is calculated at the step 304. Next, at a step 308, corresponding to the shifted amount for each one pixel and pixel after decimal points, the image data subjected to correction of pixel after decimal points so as to suppress shift of the pixel after decimal points is obtained.

Next, at a step 310, reduced image generation processing for generating reduced image data containing at least a part of the image data obtained at the step 308 through image processing such as compression and thinning is performed. Next, at a step 312, the reduced image generated at the step 310 is displayed on the LCD 46 and then this routine is finished.

As described above, since correction is performed by calculating the shifted amount in units of one pixel, and correction is performed corresponding to the shifted amount of pixel after decimal points when displaying a reduced image, more accurate correction processing becomes possible.

In the above-mentioned embodiment, although the image data subjected to correction processing is displayed, the image data subjected to correction processing may be sequentially stored in the external memory 42.

Further, in the above-nentioned embodiment, although the digital camera is employed as the shake correction device, the shake correction device is not limited to the digital camera and may be the image pickup device such as video cameras and the like. It is also possible to apply to devices having image pick-up function such as cellular phones with camera, portable terminals with a camera.

As described above, according to the signal processing device, the image pickup device and the signal processing method in accordance with the embodiment of the invention, it is possible to remove the low frequency component included in the shake signal corresponding shake of the device body and control attenuation of the shake signal due to removal of the low frequency component. This enables easily obtaining the shake signal with high accuracy.

What is claimed is:

1. A signal processing device comprising:
   a detecting mechanism that, based upon a predetermined stable state, outputs a shake signal corresponding to shake of a device body from the stable state;
   a DC removing mechanism that outputs a DC component removing signal obtained by removing a predetermined low frequency component from the shake signal of said detecting mechanism;
   a calculating mechanism that calculates attenuation characteristics of the shake signal attenuated in said DC removing mechanism, wherein said attenuation characteristics are based on the DC component removing signal; and
   a generating mechanism that generates a composite signal obtained by combining said DC component removing signal with an attenuating signal corresponding to the attenuation characteristics calculated in said calculating mechanism, as the shake signal representing shake of the device body.

2. A signal processing device according to claim 1, wherein said DC removing mechanism determines the frequency component to be removed, based on a filter having a predetermined time constant.

3. A signal processing device according to claim 1, wherein said detecting mechanism outputs the shake signal corresponding to said shake by detecting at least an angular speed at the time when the device body is shifted.

4. A signal processing device according to claim 1, wherein said detecting mechanism comprises at least two sensors.

5. A signal processing device according to claim 4, wherein one of said at least two sensors of said detecting mechanism detects shake of the device in the vertical direction and another of said at least two sensors detects shake of the device in a direction rotated by 90 degrees from said vertical direction.

6. A signal processing device according to claim 1, wherein said calculating mechanism calculates a shifted amount of a segmentation effective signal in each of horizontal and vertical directions for shifting a segmentation region in directions for suppressing shift in a horizontal and vertical directions due to shake of the device body.

7. A signal processing device according to claim 6, wherein said calculating mechanism calculates the shifted amount in units of one pixel.

8. A signal processing device comprising:
   a detecting mechanism that, based upon a predetermined stable state, outputs a shake signal corresponding to shake of a device body from the stable state;
   a DC removing mechanism that outputs a DC component removing signal obtained by removing a predetermined low frequency component from the shake signal of said detecting mechanism;
   a deriving mechanism that derives a signal corresponding to attenuation characteristics of the shake signal attenuated in said DC removing mechanism, as a reference signal, wherein said attenuation characteristics are based on the DC component removing signal; and
   a creating mechanism that creates a signal representing the component of the DC component removing signal, based upon said reference signal, as the shake signal representing shake of the device body.

9. A signal processing device according to claim 8, wherein said DC removing mechanism determines the frequency component to be removed, based on a filter having a predetermined time constant.

10. A signal processing device according to claim 8, wherein said detecting mechanism outputs the shake signal corresponding to said shake by detecting at least an angular speed at the time when the device body is shifted.

11. A signal processing device according to claim 8, wherein said detecting mechanism comprises at least two sensors.

12. A signal processing device according to claim 8, wherein derivation of the reference signal by the deriving mechanism and creation of the signal based upon the reference signal as the shake signal by the creating mechanism is repeated.

13. An image pickup device comprising:
   a detecting mechanism that, based upon a predetermined stable state, outputs a shake signal corresponding to shake of a device body from the stable state;
   a DC removing mechanism that outputs a DC component removing signal obtained by removing a predetermined low frequency component from the shake signal of said detecting mechanism;
   a calculating mechanism that calculates attenuation characteristics of the shake signal attenuated in said DC removing mechanism, wherein said attenuation characteristics are based on the DC component removing signal;
   a generating mechanism that generates a composite signal obtained by combining said DC component removing signal with an attenuating signal corresponding to the attenuation characteristics calculated in said calculating mechanism, as the shake signal representing shake of the device body;
   a setting mechanism that sets a part of a photographed image photographed by an imaging device for picking up image of an object as an effective imaging region, based on an input signal and acquires image data of the photographed image within the effective imaging region as image data by photographing; and
   a controlling mechanism that outputs, to said setting mechanism, a change signal for changing said effective imaging region according to the shake signal of said generating mechanism so as to compensate for the shake of the device body.

14. An image pickup device according to claim 13, wherein said DC removing mechanism determines the frequency component to be removed, based on a filter having a predetermined time constant.

15. An image pickup device according to claim 13, wherein calculation of the attenuation characteristics by the calculating mechanism and generation of the shake signal based on the calculated attenuation characteristics by the generating mechanism is repeated.

16. An image pickup device according to claim 13, wherein said detecting mechanism outputs the shake signal corresponding to said shake by detecting at least an angular speed at the time when the device body is shifted.

17. An image pickup device according to claim 16, wherein said detecting mechanism comprises at least two sensors.

18. An image pickup device according to claim 17, wherein one of said at least two sensors of said detecting mechanism detects shake of the device in the vertical direction and another of said at least two sensors detects shake of the device in a direction rotated by 90 degrees from said vertical direction.

19. A signal processing method of outputting, based upon a predetermined stable state, a shake signal corresponding to shake of the device body from the stable state, the method comprising:
   outputting a DC component removing signal obtained by removing a predetermined low frequency component from said shake signal;
   calculating attenuation characteristics of shake signal attenuated in the step of outputting the DC component removing signal, wherein said attenuation characteristics are based on the DC component removing signal; and
   generating a composite signal obtained by combining said DC component removing signal with an attenuating signal corresponding to said calculated attenuation characteristics, as the shake signal representing shake of the device body.

20. A signal processing method according to claim 19, wherein a frequency component to be removed is determined based upon a filter having a predetermined time constant in the step of removing the low frequency component.

21. A signal processing method according to claim 19, wherein the step of outputting said DC component removing signal, the step of calculating the attenuation characteristics of said shake signal, and the step of generating the composite signal obtained by combining said DC component removing signal with the attenuating signal corresponding to said calculated attenuation characteristic, as the shake signal representing shake of the device body are repeated until the device body attains a stable state.

22. A signal processing method according to claim 19, further comprising calculating a shifted amount of a segmentation effective signal in each of horizontal and vertical directions for shifting a segmentation region in directions for suppressing shift in a horizontal and vertical directions due to shake of the device body.

23. A signal processing device according to claim 22, further comprising calculating the shifted amount in units of one pixel.

* * * * *